United States Patent Office 3,163,586
Patented Dec. 29, 1964

3,163,586
METHOD FOR PREPARING 5'-NUCLEOTIDES
Yasunari Ishida, Ikeda, Kazuwo Motizuki and Minoru Uchida, Takarazuka, Koichiro Wakita, Gose, and Yoshio Nakao, Osaka, Japan, assignors to Takeda Chemical Industries, Ltd., Osaka, Japan
No Drawing. Filed Aug. 27, 1963, Ser. No. 304,956
Claims priority, application Japan, Dec. 13, 1960, 35/49,122
15 Claims. (Cl. 195—28)

This invention relates to a novel and useful method for preparing 5'-nucleotides.

In the present application, the term "RNase" designates a group of hydrolytic enzymes participating in the successive hydrolysis of nucleic acids or their derivatives into 5'-nucleotides, so that the "RNase" contains at least phosphodiesterase, and the term "phosphomonoesterase" is used as a synonymn of "5'-nucleotidase" unless otherwise noted, so that it designates an enzyme or enzymes capable of catalyzing the hydrolysis of 5'-mononucleotides into the corresponding nucleosides.

It has been known that sodium 5'-inosinate is useful as an agent to enhance the taste or flavor of foodstuffs or beverages. Recently, it has been found that some other 5'-nucleotides have a good taste per se or are able to further improve the enhanced good taste due to disodium 5'-inosinate, so that they are also useful as agents for enhancing the taste or flavor or foodstuffs. Due to these findings, the production of 5'-nucleotides has become very important.

As a method for industrially producing 5'-nucleotides, an enzymatic means is employed, wherein nucleic acids, their derivatives modified at the base-part, partial hydrolyzates thereof or oligonucleotides are hydrolyzed by utilizing the action of the RNase-system produced by microorganisms, 5'-nucleotides being recovered from the reaction mixture. That is, a variety of hydrolyzing enzymes being contained in the RNase-system, these hydrolyzing enzymes simultaneously or successively attack the nucleic acids or their derivatives to give 5'-nucleotides by the resulting hydrolysis.

However, the enzyme-system generally also contains phosphomonoesterases, i.e. nucleotidases, which act to decompose rapidly the 5'-nucleotides produced as above into nucleosides. Therefore, when the said enzymatic means is employed in the industrial production of 5'-nucleotides, the practice has been to add such phosphomonoesterase-inhibitors as phosphates, arsenites, cyanides or fluorides, in order to prevent the decomposition of the produce 5'-nucleotides into nucleosides.

However, the addition of such a phosphomonoesterase-inhibitor causes some undesirable features in the process of the hydrolyzing reactions: first, such a phosphomonoesterase-inhibitor not only inhibits the activity of phosphomonoesterases but also affects the whole RNase-system and disturbs the activity of each enzyme composing the system, so that the addition results in lowering the reaction velocity of the hydrolysis or in the interruption of the hydrolysis at an inadequate stage; secondly, when thus-produced 5'-nucleotides are separated from the reaction mixture, it is not easy to eliminate the phosphomonoesterase-inhibitor from the product mixture. Thus, there are shortcomings in the addition of the above-mentioned phosphomonoesterase-inhibitor and the process is not preferably employed.

Under these circumstances in the enzymic process for preparing 5'-nucleotides, this invention provides a remarkable improvement for inactivating phosphomonoesterase-activity in the RNase-containing mixture. For realizing the object of the present invention, three basic procedures are offered: first, incubating the microorganisms produc-ing the RNase-system in the presence of specific metal ions; second, addition of organic hydroxy-compounds such as phenol, lower aliphatic alcohol, etc.; and, third, heat treatment at a specific pH. None of these treatments disturbs either the acivity of the RNase-system or the recovery of 5'-nucleotides from the resulting reaction mixture, although it inactivates the phosphatase-activity. For the desired purpose, it is practically sufficient to effect one of the three presented treatments, but, as a safety factor, two or three of the procedures may of course be effected in one process.

The microorganisms to be employed for the production of the RNase-system are, for example, those belonging to:

Order Actinomycetales, such as—
    Streptomyces coelicolor (Müller) Waksman et Henrici
    Streptomyces griseus (Krainsky) Waksman et Henrici
    Streptomyces sp. No. 5741
    Streptomyces flavus (Krainsky) Waksman et Henrici
    Streptomyces lavendulae (Waksman et Curtis) Waksman et Henrici
    Streptomyces ruber (Krainsky) Waksman et Henrici
    Streptomyces viridochromogenes (Krainsky) Waksman et Henrici
    Streptomyces purpurescens Lindenbeim
    Streptomyces albogriseolus Benedict, Shotwell et Pridham
    Streptomyces olivochromogenes (Bergey et al.) Waksman et Henrici
    Streptomyces gougeroti (Duché) Waksman et Henrici
    Streptomyces griseoflavus (Krainsky) Waksman et Henrici
    Streptomyces aureus (Waksman et Curtis) Waksman et Henrici
Fungi Imperfecti, such as:
    Fusarium roseum Link
    Fusarium solani (Mart.) Appel et Wollenweber
    Verticillium niveostratosum Lindau
    Gliomastix convoluta (Harz) Mason
    Helminthosporium sigmoideum var. irregulare Cralley et Tullis
Plectascales, such as:
    Aspergillus elegans Gasperini
    Aspergillus flavipes (Bainier et Sartory) Thom et Church
    Aspergillus fischeri Wehmer
    Aspergillus melleus Yukawa
    Aspergillus nidulans (Eidam) Winter
Eubacteriales, such as:
    Bacillus brevis Migula, emend. Ford
    Bacillus subtilis Cohn, emend. Prazmowski
Ascomycetes, such as:
    Anixiella reticulispora Saito et Minoura
    Botryosphaeria ribis chromogena Grossenb. et Duggar
    Chaetomidium japonicum Saito et Okazaki
    Glomerella cingulata (Stonem.) Spauleding et Schrenk
    Neurospora crassa Shear et Dodge
    Neurospora sitophila Shear et Dodge
    Ophiobolus miyabeanus Ito et Kuribayashi
    Ophiostoma ulmi (Buisman) Nannf.
    Sordaria fimicola (Rab.) Cesari et de Notaris
    Tilachilidium humicola Oudemans The hydrolysis of the nucleic acids or their derivatives is effected by the action of a culture broth of the above-mentioned microorganisms or of a material containing RNase as culture filtrate, cell or mycelium suspension, extracted enzyme system which may be crude or partially purified, etc. The extracted enzymes fully purified may, of course, be used if the inconvenience involved in the purification procedure is disregarded. However, purification is too difficult to be employed for practical production.

One of the above-mentioned microorganisms is cultivated in a culture medium. The culture medium may be solid or liquid; however, the latter form is desirable for effecting the process on a large scale. It is usually required that the culture medium contains such nutrients for the microorganism as assimilable carbon sources, digestible nitrogen sources, and preferably, inorganic substances, vitamins, trace elements, growth promoting factors, etc. These nutrients may be obtained from natural sources or may be synthetic. As the carbon sources there may be used, for examples, glucose, lactose, starch, dextrin, maltose, etc.; as the nitrogen sources, for example, peptone, meat extracts, soy-bean flour, cornsteep liquor, casein, gluten, rice bran, amino acids, urea, ammonium salts, etc.; and as the inorganic nutrients, for example, sodium chloride, potassium nitrate, calcium carbonate, magnesium sulfate, etc.

One of the procedures to inactive the phosphomonoesterase-activity in the present invention may be adopted before or at the early stage of the incubation. When the incubation of the microorganism is effected in the presence of an appropriate amount of such a metal ion or metal ions as Cr, Mn, Fe, Co, and Ni, the production of phosphomonoesterase is greatly inhibited. Although it may be thought that these metal ions have the property of inactivating the action of the phosphomonoesterase to be produced, this interpretation does not appear to be correct, because the once-produced phosphomonoesterase is not so inactivated by those metal ions, and the presence of the said metal ions at the stage of the incubation is necessary for inactivating phosphomonoesterase-activity of the culture broth or the like. The metal ion may be added in such a form as a metal itself, a metal alloy, a metal hydroxide, a metal oxide, an organic or inorganic salt of the metal, the metal compound in a naturally occurring substance to be employed as a nutrient for the microorganism, or the metal complex, etc., as long the the metal ion can exist in the culture medium by the addition of the said material and the object is realized. The amount of the metal ion to be added is variable; however, it is preferred not to add the meal compound in great excess or in insufficient amount. The preferable amount differs in accordance with the kind of microorganism and/or the culture medium employed. Usually, the metal ion may preferably be added to the culture medium in a concentration of $$\frac{1}{5,000} M \sim \frac{1}{100} M$$

(M=molar concentration). The quantity is far more than the naturally contaminating quantity in a usual medium, but far less than the quantity added to hitherto-used phosphomonoesterase-inhibitor. It is generally preferable that the metal ion be added before or at an early stage of the incubation; however, if desired, it may be added later.

In the method of the present invention for hydrolyzing nucleic acids or their derivatives, the enzymic activity of the thus-obtained culture broth, its filtrate, cell or mycelium suspension, cell or mycelium itself, cell or mycelium extracts, or extracted enzymes is applied to the nucleic acids or their derivatives to be hydrolyzed into 5'-nucleotides.

In order to inactivate the coexisting phosphomonoesterase, further means may be adopted at this stage, i.e. addition of an organic hydroxy compound and/or heat treatment at a proper pH.

In the presence of an organic hydroxy-compound, phosphomonoesterase is substantially inactivated. As organic hydroxy-compounds there may be employed, for example, such a phenol as phenol, cresol, etc., such a lower aliphatic alcohol as methanol, ethanol, n-propanol, isopropanol, n-butanol, isobutanol, amyl alcohol, isoamyl alcohol, etc. It is usually sufficient to use only one hydroxy-compound; however, if desired, two or more of them may be used at the same time. When the hydroxy-compound is aromatic, i.e. a phenol compound, a sufficient quantity to be added is about 0.1 to 10%, desirably about 1 to 5%, by weight relative to the quantity of the culture broth or other enzyme sources. In the case of an aliphatic hydroxy-compound, it is usually required that a greater amount such as 1 to 30% by weight is added to the culture medium, but 2 to 5% by weight is usually sufficient for the purpose.

Another means for inactivating the phosphomonoesterase is to subject the enzyme sources to a heat treatment at an appropriate pH. This treatment is effected by keeping the enzyme source at about 35 to 60° C. while adjusting the pH at about 3.5 to 5.0. The desirable period for the treatment varies from several seconds to a few hours in accordance with such factors as the pH, the temperature, the kind of microorganism, the form of the enzyme sources, etc., but it is usually less than 10 minutes. Even at a temperature lower than 35° C. but higher than about 15° C., a fairly good effect is observed by keeping the enzyme source at the above-said pH for one to a few hours.

In the resulting RNase-containing mixture which has undergone at least one of the three means according to the present invention, the co-existing phosphomonoesterase is inactivated to a considerable extent; especially the addition of a phenol compound or a lower aliphatic alcohol is effective, so that the mixture can favorably be employed for the objective hydrolysis of nucleic acids or their derivatives. When two or all three means are applied to the same RNase-containing mixture, the inactivation becomes more complete. When the addition of a phenol compound or a lower aliphatic alcohol is combined with the heat treatment at an acid pH, the phosphomonoesterase is inhibited quite desirably. Of course, if desired, the elimination of impurities may be effected as to the RNase-containing mixture prior to the objective hydrolysis.

The hydrolysis is effected by allowing the above-obtained RNase-containing mixture to react with such a starting material as nucleic acids, desoxyribonucleic acid, or deaminonucleic acid; their derivatives transformed in their base part; hydrolyzates obtained by partial hydrolysis of nucleic acids or derivatives transformed therefrom by the action of e.g. an alkali or an enzyme or enzymes capable of partially hydrolyzing nucleic acids; or tissues of organisms; oligonucleotides; or those materials obtained therefrom which contain any of the above-mentioned nucleic acids or their derivatives. Usually, muscles and viscera of animals such as fish, squid, etc., culture broths of microorganisms such as yeast, etc. are conveniently utilized. These starting materials may be crude or dried and may also be powdered or ground into powders, pastes, lumps, etc. In actual practice, it is usually convenient that the above-mentioned powders, pastes or lumps are suspended in a reaction medium or extracted with a solvent and the suspension or solution is mixed with the RNase-containing mixture as afore-obtained and then the mixture is kept at a desirable pH and a suitable temperature. As the solvent for the hydrolysis there is generally used water and there may be added acids, bases, and salts as well as the afore-mentioned organic hydroxy-compound such as phenols, alcohols, etc. The hydrolysis reaction is preferably effected at a temperature from 30 to 50° C. in a weakly acidic to weakly alkaline aqueous medium. The reaction time differs in accordance with such factors as the kind of starting material, RNase-containing mixture, reaction media, reaction temperature, etc. At any rate, the reaction may be continued until the accumulation of the objective 5'-nucleotides becomes maximum.

The invention will now be described in further particularity by means of the following illustrative examples. It will be understood, of course, that the invention is not limited to the particular details of these examples since they only set forth preferred exemplary embodiments of the invention. In these examples, all percentages are on a weight basis, unless otherwise noted. Temperatures are all uncorrected, and abbreviations "kg.," "g.," "mg.," "l.," "ml.," "cc.," and "cm." mean kilogram, gram, milligram, liter, milliliter, cubic centimeter and centimeter, respectively. Numbers and abbreviations attached to the names of microorganisms show the respective accession numbers to the strain in Northern Utilization Research Branch of U.S. Department of Agriculture, Peoria, Ill., U.S.A. (NRRL), or American Type Culture Collection, Washington, D.C., U.S.A. (ATCC).

Example 1

In an aqueous medium consisting of 1% of glucose, 1% of soluble starch, 1% of cornsteep liquor, 0.5% of soybean flour, 0.1% of ammonium sulfate, 0.05% of magnesium sulfate ($MgSO_4 \cdot 7H_2O$), 0.3% of calcium carbonate, 0.028% of nickel sulfate and water, and being adjusted to pH 7.0, *Streptomyces aureus* (Waksman et Curtis) Waksman et Henrici (ATCC–13404) is incubated for 24 hours. After the incubation, 1% of phenol relative to the amount of the culture broth is added to the latter and the broth is thoroughly stirred. Then the broth is adjusted to pH 4.1 and allowed to stand at 50° C. for 1 minute. Thereafter, the pH of the broth is adjusted again to the neighborhood of 7 as quickly as possible while the broth is being cooled.

To 10 parts by volume of yeast suspension, in which 10% of dried yeast is contained, there are added 1.5 parts by volume of the above-obtained broth. The mixture is adjusted to pH 9.0 at first and allowed to stand at 42° C. for 12 hours, whereupon the pH of the mixture becomes about 7. In the reaction mixture, the respective yields of 5'-inosinic acid and 5'-guanylic acid are 87% and 83% reltaive to the theoretical amount.

Example 2

In an aqueous medium consisting of 2% of glucose, 2% of soluble starch, 2% of cornsteep liquor, 3% of soybean flour, 0.1% of ammonium sulfate, 0.05% of magnesium sulfate ($MgSO_4 \cdot 7H_2O$), 0.3% of calcium carbonate, 0.13% of nickel sulfate and water, and being adjusted to pH 7.0, *Streptomyces aureus* (Waksman et Curtis) Waksman et Henrici (ATCC–13404) is incubated for 24 hours. After the incubation, 1% of phenol relative to the amount of the culture broth is added to the latter, and the broth is thoroughly stirred. Then the culture broth is adjusted to pH 4.1 and allowed to stand at 50° C. for 1 minute. Thereafter, the pH of the broth is adjusted again to the neighborhood of 7 as quickly as possible while the broth is being cooled.

To 10 parts by volume of yeast suspension, which contains 10% of dried yeast, there is added 1 part by volume of the above-obtained broth. The mixture is adjusted to pH 9.0 at first and allowed to stand at 42° C. for 12 hours, whereupon the pH of the mixture becomes about 7. In the reaction mixture thus obtained, the respective yields of 5'-inosinic acid and 5'-guanylic acid are 92% and 89% relative to the theoretical amount.

Example 3

In an aqueous medium consisting of 2% of glucose, 2% of soluble starch, 2% of cornsteep liquor, 3% of soybean flour, 0.1% of ammonium sulfate, 0.05% of magnesium sulfate ($MgSO_4 \cdot 7H_2O$), 0.3% of calcium carbonate and water, and being adjusted to pH 7.0, *Streptomyces aureus* (Waksman et Curtis) Waksman et Henrici (ATCC–13404) is incubated for 24 hours. After the incubation, 1% of phenol relative to the amount of the culture broth is added to the latter, and the broth is thoroughly stirred. Then the broth is adjusted to pH 3.9 and allowed to stand at 50° C. for 1 minute. Thereafter, the pH of the broth is adjusted again to the neighborhood of 7 as quickly as possible while the broth is being cooled.

To 10 parts by volume of yeast suspension, which contains 10% of dried yeast, there is added 1 part by volume of the above-obtained broth. The mixture is adjusted to pH 9.0 at first and allowed to stand at 42° C. for 9 hours, whereupon the pH of the mixture becomes about 7. In the reaction mixture thus obtained, the respective yields of 5'-inosinic acid and 5'-guanylic acid are 76% and 63% relative to the theoretical amount.

Example 4

In an aqueous medium consisting of 1% of glucose, 1% of soluble starch, 1% of cornsteep liquor, 0.1% of ammonium sulfate, 0.05% of magnesium sulfate ($MgSO_4 \cdot 7H_2O$), 0.028% of nickel sulfate and water, and being adjusted to pH 7.0, *Streptomyces aureus* (Waksman et Curtis) Waksman et Henrici (ATCC–13404) is incubated for 24 hours. After the incubation, 1.25% of cresol relative to the amount of the culture broth is added to the latter, and the broth is thoroughly stirred. Then the broth is adjusted to pH 4.1 and allowed to stand at 50° C. for 1 minute. Thereafter, the pH of the broth is adjusted again to the neighborhod of 7 as quickly as possible while the broth is being cooled.

To 10 parts by volume of yeast suspension, which contains 10% of dried yeast, there is added 1 part by volume of the above-obtained broth. The mixture is adjusted to pH 9.0 at first and allowed to stand at 42° C. for 12 hours, whereupon the pH of the mixture becomes about 7. In the reaction mixture thus obtained, the respective yields of 5'-inosinic acid and 5'-guanylic acid are 83% and 84% relative to the theoretical amount.

Example 5

Instead of the *Streptomyces aureus* (Waksman et Curtis) Waksman et Henrici (ATCC–13404) used in Examples 1, 2, 3 and 4, any of the following microorganisms may be employed. A similar result to that of Examples 1, 2, 3 or 4 is obtained by employing any of these microorganisms:

*Streptomyces albogriseolus* Benedict, Shotwell et Pridham (NRRL B–1305);
*Streptomyces purpurescens* Lindenbeim (NRRL B–1454);
*Streptomyces coelicolor* (Müller) Waksman et Henrici (ATCC–13405);
*Helminthosporium sigmoideum* var. *irregulare* Cralley (ATCC–13406);
*Bacillus brevis* Migula emend. Ford (ATCC–8185);
*Aspergillus elegans* Gasperini (ATCC–13829);
*Botryosphaeria ribis chromogena* G. et C. (ATCC–13834);
*Chaetomidium japonicum* Saito et Okazaki (ATCC–13835);
*Glomerella cingulata* (Stomem.) Spauld. et v. Schr. (ATCC–13836);
*Neurospora crassa* Shear et Dodge (ATCC–13837);
*Ophiobolus miyabeanus* Ito et Kuribayashi (ATCC–13839);
*Ophiostoma ulmi* (Buisman) Nannf. (ATCC–13840);
*Sordaria fimicola* (Rab.) Cesari et de Notaris (ATCC–13841); and
*Tilachlidium humicola* Oudemans.

Example 6

In an aqueous medium consisting of 2% of soluble starch, 2% of cornsteep liquor, 1% of peptone, 0.2% of ammonium sulfate, 0.05% of magnesium sulfate ($MgSO_4 \cdot 7H_2O$), 0.5% of calcium carbonate, 0.01% of cobaltous chloride and water and being adjusted to pH 7.0, *Streptomyces aureus* (Waksman et Curtis) Waksman et Henrici (ATCC–13404) is incubated at 28° C. for 35 hours under shaking, then the broth is filtered. One part by volume of the filtrate is mixed with 3 parts by volume of the nucleic acid solution obtained by extracting yeast, and the mixture is kept at 38° C. at pH 7.8–8.0 for 12 hours to effect the hydrolysis of the nucleic acid. The yield of 5'-inosinic acid produced in the mixture is 48% of the theoretical amount.

On the other hand, when cobaltous chloride is not added in the said medium, the yield of 5'-inosinic acid is only 11%.

*Example 7*

In an aqueous medium consisting of 2% of cornsteep liquor, 1% of glucose, 2% of soluble starch, 1% of peptone, 0.1% of ammonium sulfate, 0.1% of ammonium nitrate, 0.05% of magnesium sulfate ($MgSO_4 \cdot 7H_2O$), 0.5% of calcium carbonate, 0.01% of cobaltous nitrate and water and being adjusted at pH 7.0, *Streptomyces aureus* (Waksman et Curtis) Waksman et Henrici (ATCC–13040) is incubated under shaking. The culture broth is filtered with a filter-press to remove the mycelia. One part by volume of the filtrate is mixed with 3 parts by volume of the nucleic acid solution obtained by extracting yeast, and the mixture is kept at 40° C. for 8 hours, during which the pH of the mixture is adjusted to pH 7.8–8.0, to effect the hydrolysis of the nucleic acid. The respective yields of 5'-inosinic acid, 5'-guanylic acid, 5'-cytidilic acid and 5'-uridylic acid are 53%, 51%, 42% and 45% of the theoretical amount.

On the other hand, when cobaltous nitrate is not added in the said medium the respective yields of the 5'-nucleotides are only 17%, 13%, 11% and 13%.

*Example 8*

In the same medium as that of Example 6 except that 0.05% of nickel sulfate is added instead of cobaltous chloride, *Streptomyces albogriseolus* Benedict et al. (NRRL–1305) is incubated at 28° C. for 35 hours under shaking, and the culture broth is filtered. One part by volume of the filtrate is mixed with 3 parts by volume of nucleic acid solution obtained by extracting yeast, and the mixture is kept at 40° C. for 10 hours to effect the hydrolysis, during which the pH of the mixture is kept at 8.2–8.3. The yield of 5'-adenylic acid in the hydrolyzate is 54% of the theoretical amount.

*Example 9*

In the same medium as that of Example 6 except that 0.004% of ferric sulfate is added instead of cobaltous chloride, *Streptomyces aureus* (Waksman et Curtis) Waksman et Henrici (ATCC–13404) is incubated for 24 hours at 28° C. After being adjusted to pH 4.5, the culture broth is kept at 50° C. for five minutes, and then the culture broth is filtered. One part by volume of the filtrate is mixed with 3 parts by volume of nucleic acid solution, and the mixture is kept at 38° C. for 12 hours to effect the hydrolysis, during which the pH of the medium is adjusted to 7.8–8.0. The yield of 5'-inosinic acid in the hydrolyzate is 75% of the theoretical amount.

*Example 10*

In the same medium as that in Example 6 except that 0.003% of ferric chloride is added instead of cobaltous chloride, *Streptomyces aureus* (Waksman et Curtis) Waksman et Henrici (ATCC–13404) is incubated for 24 hours at 28° C., and then the culture broth is filtered. One part by volume of the filtrate is mixed with 3 parts by volume of nucleic acid solution, and the mixture is kept at 38° C. for 12 hours to effect the hydrolysis, during which the pH of the medium is adjusted to 7.8–8.0, whereupon 48% of the theoretical amount of 5'-inosinic acid is obtained in the reaction mixture.

*Example 11*

In an aqueous medium consisting of 2% of glucose, 2% of lactose, 3% of cornsteep liquor, 1% of soy-bean flour, 0.1% of ammonium nitrate, 0.05% of magnesium sulfate ($MgSO_4 \cdot 7H_2O$), 0.3% of calcium carbonate and water and being adjusted at pH 7.0, *Streptomyces aureus* (Waksman et Curtis) Waksman et Henrici (ATTC–13404) is incubated under shaking for 24 hours. The culture broth is adjusted to pH 4.0 with sulfuric acid and kept at room temperature for 1 hour. The solid part of the broth is eliminated by centrifugation and the supernatant liquid is used as the enzyme solution for the hydrolysis of nucleic acid.

In a nucleic acid solution which contains nucleic acid in a quantity corresponding to 1.06 mg./cc. of adenylic acid which is one of the constituents of the nucleic acid, 0.1 mol of tris-hydroxymethylaminomethane is dissolved and the solution adjusted with hydrochloric acid to pH 8.0. A mixture of 6 parts by volume of the above-prepared nucleic acid solution, 3 parts by volume of the above-obtained enzyme solution and 1 part by volume of water is kept for 12 hours at 37° C. to effect the hydrolysis of nucleic acid, whereupon 86% of the theoretical amount of 5'-inosinic acid is obtained in the reaction mixture.

*Example 12*

In an aqueous medium consisting of 2% of cornsteep liquor, 1% of glucose, 2% of soluble starch, 1% of peptone, 0.5% of magnesium sulfate ($MgSO_4 \cdot 7H_2O$), 0.5% of calcium carbonate and water and being adjusted at pH 7.0, *Streptomyces aureus* (Waksman et Curtis) Waksman et Henrici (ATTC–13404) is incubated for 24 hours under shaking. The culture broth is adjusted with sulfuric acid to pH 4.8, and then kept at 50° C. for 15 minutes. After cooling, the broth is centrifuged to remove the solid parts and the resulting supernatant fluid is used as the enzyme solution for the hydrolysis of nucleic acid.

In a solution comprising nucleic acid in a quantity corresponding to 1.155 mg./cc. of adenylic acid which is one of the constituents of the nucleic acid, 0.1 mol of tris-hydroxymethyl-aminomethane is dissolved, and the solution is adjusted to pH 8.0 with hydrochloric acid. A mixture of 6 parts by volume of the above-prepared nucleic acid solution, 3 parts by volume of the above-obtained enzyme solution and 1 part by volume of water is kept at 37° C. for 12 hours to effect the hydrolysis of nucleic acid, whereupon 76% of the theoretical amount of 5'-inosinic acid is produced in the reaction mixture.

*Example 13*

In the same medium as that used in Example 12, *Streptomyces aureus* (Waksman et Curtis) Waksman et Henrici (ATCC–13404) is incubated for 24 hours. One half of the culture broth is adjusted to pH 4.5 and kept at 50° C. for 5 minutes, then cooled, and the broth thus treated is used as the enzyme source for the hydrolysis. The other half of the culture broth is also used as enzyme source without being subjected to any treatment. Both enzyme sources are allowed to react with a solution containing nucleic acid in a quantity corresponding to 1.08 mg./cc. of adenylic acid which is one of the constituents of nucleic acid, to effect the hydrolysis. The results are as follows:

| Enzyme Source | Mixing Ratio of nucleic acid solution:enzyme source:water (by volume) | Time for Hydrolysis (hour) | Yield of 5'-inosinic acid relative to the theoretical amount (percent) |
|---|---|---|---|
| Heated at 50° C. at pH 4.5 | 7:2:1 | 4 | 61 |
|  | 3:3:0 | 4 | 61 |
| Without any treatment | 7:2:1 | 4 | 6 |
|  | 3:3:0 | 4 | 6 |

Example 14

In an aqueous medium consisting of 1% of glucose, 1% of soluble starch, 1% of cornsteep liquor, 0.5% of soy-bean flour, 0.1% of ammonium sulfate, 0.05% of magnesium sulfate ($MgSO_4 \cdot 7H_2O$), 0.3% of calcium carbonate, 0.028% of nickel sulfate and water, and being adjusted to pH 7.0, *Streptomyces aureus* (Waksman et Curtis) Waksman et Henrici (ATCC-13404) is incubated for 24 hours. After the incubation, 3% of n-butanol relative to the amount of the culture broth is added to the latter and the broth is thoroughly stirred. Then the broth is adjusted to pH 4.1 and allowed to stand at 50° C. for 1 minute. Thereafter, the pH of the broth is adjusted again to the neighborhood of 7 as quickly as possible while the broth is being cooled.

To 10 parts by volume of yeast suspension, in which 10% of dried yeast is contained, there are added 1.5 parts by volume of the above-obtained broth. The mixture is adjusted to pH 9.0 at first and allowed to stand at 42° C. for 12 hours, whereupon the pH of the mixture becomes about 7. In the reaction mixture, the respective yields of 5'-inosinic acid and 5'-guanylic acid are 94% and 92% relative to the theoretical amount.

On the other hand, when n-butanol was not added to the culture broth, the respective yields of 5'-inosinic acid and 5'-guanylic acid were 67% and 66%.

Example 15

In an aqueous medium consisting of 2% of glucose, 2% of soluble starch, 2% of cornsteep liquor, 3% of soy-bean flour, 0.1% of ammonium sulfate, 0.05% of magnesium sulfate ($MgSO_4 \cdot 7H_2O$), 0.3% of calcium carbonate, 0.13% of nickel sulfate and water, and being adjusted to pH 7.0, *Streptomyces aureus* (Waksman et Curtis) Waksman et Henrici (ATCC-13404) is incubated for 24 hours. After the incubation, 3% of n-butanol relative to the amount of the culture broth is added to the latter, and the broth is thoroughly stirred. Then the culture broth is adjusted to pH 4.1 and allowed to stand at 50° C. for 1 minute. Thereafter, the pH of the broth is adjusted again to the neighborhood of 7 as quickly as possible while the broth is being cooled.

To 10 parts by volume of yeast suspension, which contains 10% of dried yeast, there is added 1 part by volume of the above-obtained broth. The mixture is adjusted to pH 9.0 at first and allowed to stand at 42° C. for 12 hours, whereupon the pH of the mixture becomes about 7. In the reaction mixture thus obtained, the respective yields of 5'-inosinic acid and 5'-guanylic acid are 97% and 94% relative to the theoretical amount.

Example 16

To the culture broth obtained in the same manner as in Example 15, there is added 3% of n-butanol relative to the amount of the culture broth, and the broth is thoroughly stirred. Then, the broth is adjusted to pH 3.9 with sulfuric acid and allowed to stand at 50° C. for 1 minute. Thereafter, the pH of the broth is adjusted again to the neighborhood of 7 as quickly as possible while the broth is being cooled.

To 10 parts by volume of yeast suspension, which contains 10% of dried yeast, there is added 1 part by volume of the above-obtained broth. The mixture is adjusted to pH 9.0 at first and allowed to stand at 42° C. for 9 hours, whereupon the pH of the mixture becomes about 7. In the reaction mixture thus obtained, the respective yields of 5'-inosinic acid and 5'-guanylic acid are 92% and 90% relative to the theoretical amount.

Example 17

To the culture broth of *Streptomyces aureus* (Waksman et Curtis) Waksman et Henrici (ATCC-13404), which was prepared after the same manner as in Example 15, there is added 3% of isoamyl alcohol relative to the amount of the culture broth, and the broth is thoroughly stirred. Then the broth is adjusted to pH 4.1 and allowed to stand at 50° C. for 1 minute. Thereafter, the pH of the broth is adjusted again to the neighborhood of 7 as quickly as possible while the broth is being cooled.

To 10 parts by volume of yeast suspension, which contains 10% of dried yeast, there is added 1 part by volume of the above-obtained broth. The mixture is adjusted to pH 9.0 at first and allowed to stand at 42° C. for 12 hours, whereupon the pH of the mixture becomes about 7. In the reaction mixture thus obtained, the respective yields of 5'-inosinic acid and 5'-guanylic acid are 92% and 91% relative to the theoretical amount.

Example 18

Instead of the *Streptomyces aureus* (Waksman et Curtis) Waksman et Henrici (ATCC-13404) used in Examples 14, 15, 16 and 17, any of the following microorganisms may be employed. A similar result to that of Examples 14, 15, 16 or 17 is obtained by employing any of these microorganisms:

*Streptomyces albogriseolus* Benedict, Shotwell et Pridham (NRRL B-1305);
*Streptomyces purpurescens* Lindenbeim (NRRL B-1454);
*Streptomyces coelicolor* (Müller) Waksman et Henrici (ATCC-13405);
*Helminthosporium sigmoideum* var. *irregulare* Cralley et Tullis (ATCC-13406);
*Baccillus brevis* Migula emend. Ford (ATCC-8185);
*Aspergillus elegans* Gasperini (ATCC-13829);
*Botryosphaeria ribis chromogena* G. et C. (ATCC-13834);
*Chaetomidium japonicum* Saito et Okazaki (ATCC-13835);
*Glomerella cingulata* (Stomem.) Spauld. et v. Schr. (ATCC-13836);
*Neurospora crassa* Shear et Dodge (ATCC-13837);
*Ophiobolus miyabeanus* Ito et Kuribayashi (ATCC-13839);
*Ophiostoma ulmi* (Buisman) Nannf. (ATCC-13840);
*Sordaria fimicola* (Rab.) Cesari et de Notaris (ATCC-13841); and
*Tilachlidium humicola* Oudemans (ATCC-13842).

Example 19

Culture broth of *Streptomyces aureus* (Waksman et Curtis) Waksman et Henrici (ATCC-13404), prepared in the same manner as in Example 14, is divided into three portions. One portion of the broth is used per se as enzyme solution A. The second portion is adjusted to pH 4.1, allowed to stand at 50° C. for 1 minute, and then the pH of the broth is adjusted again to the neighborhood of 7 while the broth is being cooled, to prepare enzyme solution B. The third portion of the broth is treated in the same manner as in Example 14, i.e. the addition of n-butanol, followed by the heat treatment at pH 4.1, to give enzyme solution C.

One part by volume of the respective enzyme solutions A, B, and C is added to 10 parts or 5 parts by volume of yeast suspensions, in which 10% of dried yeast is contained. The respective mixtures are allowed to stand 4 hours after the manner of Example 14 to give the results shown in the following table:

| Enzyme solution | Ratio of Yeast Suspension to Enzyme solution by volume | Yields Relative to the Theoretical Amount (percent) | |
|---|---|---|---|
| | | 5'-inosinic acid | 5'-guanylic acid |
| A | 10:1 | 16 | 15 |
| | 5:1 | 17 | 17 |
| B | 10:1 | 35 | 33 |
| | 5:1 | 38 | 34 |
| C | 10:1 | 65 | 66 |
| | 5:1 | 73 | 71 |

Example 20

To the culture broth of *Streptomyces aureus* (Waksman et Curtis) Waksman et Henrici (ATCC–13404), obtained in the same way as in Example 14, there is added lower aliphatic alcohol as illustrated in the following table. Then, at once or after one hour or after two hours, the broth is subjected to heat treatment at pH 4.1. The respective culture broths thus treated are added to an aqueous suspension of dried yeast, and the mixtures are adjusted to pH 9.2 and allowed to stand 7 hours at 42° C. Yields of the sum of 5'-inosinic acid and 5'-guanylic acid in the respective mixtures are as follows:

| Concentration of alcohol added to culture broth (percent by volume) | 3% | | | 5% | | | 7% | | |
| --- | --- | --- | --- | --- | --- | --- | --- | --- | --- |
| The time between addition of alcohol and heat treatment (hour) | 0 | 1 | 2 | 0 | 1 | 2 | 0 | 1 | 2 |
| n-Propanol | | | | | | 73 | | | |
| Isopropanol | | | | | 71 | | | | |
| Isobutanol | 50 | 62 | 65 | 57 | 60 | 76 | 80 | 70 | 83 |
| n-Butanol | 80 | 83 | 90 | 77 | 83 | 78 | 70 | 72 | 71 |
| Isoamyl alcohol | 64 | 85 | 72 | 69 | 87 | 77 | 70 | 69 | 59 |

Example 21

In an aqueous medium consisting of 2% of glucose, 2% of soluble starch, 2% of cornsteep liquir, 3% of soybean flour, 0.1% of ammonium sulfate, 0.05% of magnesium sulfate (MgSO$_4$·7H$_2$O), 0.3% of calcium carbonate and 0.13% of nickel sulfate and water, and being adjusted to pH 7.0, *Streptomyces aureus* (Waksman et Curtis) Waksman et Henrici (ATCC–13404) is incubated for 24 hours. After the incubation, 1% of phenol relative to the amount of the culture broth is added to the latter, and the broth is thoroughly stirred. Then, the broth is adjusted to pH 4.1 with diluted sulfuric acid and allowed to stand at 52° C. for 1 minute. Thereafter, the pH of the broth is adjusted again to the neighborhood of 7 as quickly as possible while the broth is being cooled.

To 10 parts by volume of deoxyribonucleic acid solution, which is prepared by dissolving deoxyribonucleic acid (prepared from salmon milt) in water in concentration of 0.8%, by adjusting the pH to 9.0 and by adding 1.8% of ammonium chloride relative to the solution to the latter, there is added 5 parts by volume of the above-obtained broth. The mixture is adjusted to pH 9.0 at first and allowed to stand at 42° C. for 6 hours, whereupon the pH of the mixture is about 9. In the reaction mixture thus obtained, respective yields of deoxy-5'-adenylic acid, deoxy-5'-cytidylic acid, deoxy-5'-guanylic acid and deoxy-5'-thymidylic acid are 78%, 82%, 86% and 95% relative to the theoretical amounts.

On the other hand, when the addition of phenol and the heat treatment at acidic pH were omitted, the respective yields of deoxy-5'-adenylic acid, deoxy-5'-cytidylic acid, deoxy-5'-guanylic acid and deoxy-5'-thymidylic acid were only 31%, 34%, 41% and 43%.

Example 22

In an aqueous medium of the same constitution as used in Example 21, *Streptomyces aureus* (Waksman et Curtis) Waksman et Henrici (ATCC–13404) is incubated for 24 hours. After the incubation, 3% of n-butanol relative to the culture broth is added to the latter, and the broth is thoroughly stirred. Then, the broth is adjusted to pH 4.1 with diluted sulfuric acid and allowed to stand at 52° C. for 1 minute. Thereafter, the pH of the broth is adjusted again to the neighborhood of 7 as quickly as possible while the broth is being cooled.

To 10 parts by volume of deoxyribonucleic acid solution, which is prepared by dissolving deoxyribonucleic acid (prepared from salmon milt) in water in concentration of 0.8%, by adjusting the pH to 9.0 and by adding 1.8% of ammonium chloride relative to the solution to the latter, there is added 5 parts by volume of the above-obtained broth. The mixture is adjusted to pH 9.0 at first and allowed to stand at 42° C. for 6 hours, when the pH of the mixture is about 9. In the reaction mixture thus obtained, respective yields of deoxy-5'-adenylic acid, deoxy-5'-cytidylic acid, deoxy-5'-guanylic acid and deoxy-5'-thymidylic acid are 80%, 81%, 84% and 94% relative to the theoretical amounts.

On the other hand, when n-butanol was not added to the culture broth, the respective yields of deoxy-5'-adenylic acid, deoxy-5'-cytidylic acid, deoxy-5'-guanylic acid and deoxy-5'-thymidylic acid were only 48%, 53%, 58% and 60%.

The present application is a continuation-in-part of Serial Number 132,533, filed August 21, 1961, and now abandoned.

Having thus disclosed the invention what is claimed is:

1. In a process for producing a mixture of 5'-nucleotides by hydrolysis of a member selected from the group consisting of nucleic acids, oligonucleotides and mixtures thereof, as starting material, by bringing the said starting material into contact with an RNase produced by an RNase-producing microorganism, the improvement of effecting the hydrolysis after adding to the RNase-containing mixture from 0.1 to 10% by weight of phenolic compound selected from the group consisting of phenol and cresol, relative to the RNase-containing mixture.

2. In a process for producing a mixture of 5'-nucleotides by hydrolysis of a member selected from the group consisting of nucleic acids, oligonucleotides and mixtures thereof, as starting material, by bringing the said starting material into contact with an RNase produced by an RNase-producing microorganism, the improvement of effecting the hydrolysis after adding to the RNase-containing mixture from 1 to 30% by weight of lower aliphatic alcohol having from 1 to 5 carbon atoms, relative to the RNase-containing mixture.

3. In the process for producing a mixture of 5'-nucleotides by hydrolysis of a member selected from the group consisting of nucleic acid, oligonucleotides and mixtures thereof, as starting material, by bringing the said starting material into contact with an RNase produced by an RNase-producing microorganism, the improvement wherein the RNase is produced by cultivating an RNase-producing microorganism in a culture medium containing from 0.0002 to 0.01 mole of a metal ion selected from the group consisting of iron, cobalt and nickel ions.

4. In the process for producing a mixture of 5'-nucleotides by hydrolysis of a member selected from the group consisting of nucleic acids, oligonucleotides and mixtures thereof, as starting material, by bringing the said starting material into contact with an RNase produced by an RNase-producing microorganism, the improvement wherein the RNase is produced by cultivating an RNase-producing microorganism in a culture medium containing from 0.0002 to 0.01 mole of a metal ion selected from the group consisting of ion, cobalt and nickel ions, by adding to the RNase-containing mixture from 0.1 to 10% by weight of phenolic compound selected from the group consisting of phenol and cresol, and by preheating the RNase-containing mixture at a temperature of from 40 to 60° C. at a pH of from 3.5 to 5.0 for a period necessary for substantially inactivating phosphomonoesterase.

5. In the process for producing a mixture of 5'-nucleotides by hydrolysis of a member selected from the group consisting of nucleic acids, oligonucleotides and mixtures thereof, as starting material, by bringing the said starting material into contact with an RNase produced by an RNase-producing microorganism, the improvement wherein the RNase is produced by cultivating an RNase-producing microorganism in a culture medium containing from 0.0002 to 0.01 mole of a metal ion selected from the group consisting of iron, cobalt and nickel ions, by adding to the RNase-containing mixture from 1 to 30% by weight of a lower aliphatic alcohol having from 1 to 5 carbon atoms, and by preheating the RNase-containing mixture at a temperature of from 40 to 60° C. at a pH of from 3.5 to 5.0 for a period necessary for substantially inactivating phosphomonoesterase.

6. The improvement in the process as claimed in claim 1, wherein the phenolic compound is phenol.

7. The improvement in the process as claimed in claim 4, wherein the phenolic compound is phenol.

8. The improvement in the process as claimed in claim 1, wherein the phenolic compound is cresol.

9. The improvement in the process as claimed in claim 4, wherein the phenolic compound is cresol.

10. The improvement in the process as claimed in claim 2, wherein the lower aliphatic alcohol is propanol.

11. The improvement in the process as claimed in claim 5, wherein the lower aliphatic alcohol is propanol.

12. The improvement in the process as claimed in claim 2, wherein the lower aliphatic alcohol is butanol.

13. The improvement in the process as claimed in claim 5, wherein the lower aliphatic alcohol is butanol.

14. The improvement in the process as claimed in claim 2, wherein the lower aliphatic alcohol is amyl alcohol.

15. The improvement in the process as claimed in claim 5, wherein the lower aliphatic alcohol is amyl alcohol.

References Cited by the Examiner
UNITED STATES PATENTS
3,104,171   9/63   Sakaguchi et al.

A. LOUIS MONACELL, *Primary Examiner.*